US009921996B2

(12) United States Patent
Burton

(10) Patent No.: US 9,921,996 B2
(45) Date of Patent: Mar. 20, 2018

(54) DIGITAL CAMERA MOUNTED ON A PACIFIER AND METHOD OF USE

(71) Applicant: Scott Jerald Burton, Oxford, MS (US)

(72) Inventor: Scott Jerald Burton, Oxford, MS (US)

( * ) Notice: Subject to any disclaimer, the term of this patent is extended or adjusted under 35 U.S.C. 154(b) by 100 days.

(21) Appl. No.: 15/046,532

(22) Filed: Feb. 18, 2016

(65) Prior Publication Data

US 2016/0248950 A1 Aug. 25, 2016

Related U.S. Application Data

(60) Provisional application No. 62/119,356, filed on Feb. 23, 2015.

(51) Int. Cl.
*H04N 5/228* (2006.01)
*G06F 13/42* (2006.01)
*H04N 7/18* (2006.01)
*G06F 13/40* (2006.01)
*H04N 5/225* (2006.01)
*A61J 17/00* (2006.01)

(52) U.S. Cl.
CPC ...... *G06F 13/4282* (2013.01); *G06F 13/4068* (2013.01); *H04N 5/2251* (2013.01); *H04N 7/183* (2013.01); *H04N 7/185* (2013.01); *A61J 17/001* (2015.05)

(58) Field of Classification Search
CPC . G06F 13/4282; G06F 13/4068; H04N 7/185; H04N 5/2251; H04N 7/183; A61J 17/001

USPC .................................. 348/222.1, 370–374
See application file for complete search history.

(56) References Cited

U.S. PATENT DOCUMENTS

| 6,193,742 | B1 | 2/2001 | Moriarty |
| 6,430,450 | B1 * | 8/2002 | Bach-y-Rita ............. A61F 9/08 |
| | | | 379/52 |
| 6,470,200 | B2 | 10/2002 | Walker et al. |
| 6,964,567 | B2 | 11/2005 | Kerschbaumer et al. |
| 2001/0044588 | A1 * | 11/2001 | Mault .................. A61B 5/0002 |
| | | | 600/549 |
| 2009/0198275 | A1 | 8/2009 | Godown et al. |
| 2012/0041487 | A1 | 2/2012 | Griffis |
| 2014/0119718 | A1 * | 5/2014 | Oh ....................... G03B 11/041 |
| | | | 396/448 |

OTHER PUBLICATIONS

Pct/us2017/016614 written opinion dated Jun. 4, 2017.

* cited by examiner

*Primary Examiner* — Yogesh Aggarwal
(74) *Attorney, Agent, or Firm* — VeRitay Group IP; Susan B. Fentress

(57) ABSTRACT

This invention relates to a method to obtain an image from the perspective of a pacifier user. The method involves the steps of: providing a digital camera mounted on pacifier apparatus 90 and capturing the image. This can be accomplished in one embodiment by providing an apparatus made of a perpendicular mounting member 30 or linear mounting member 35 that has a plurality of grooved prongs shaped to secure the ring 20 of a pacifier; and a digital camera 40 attached to the perpendicular mounting member 30.

11 Claims, 7 Drawing Sheets

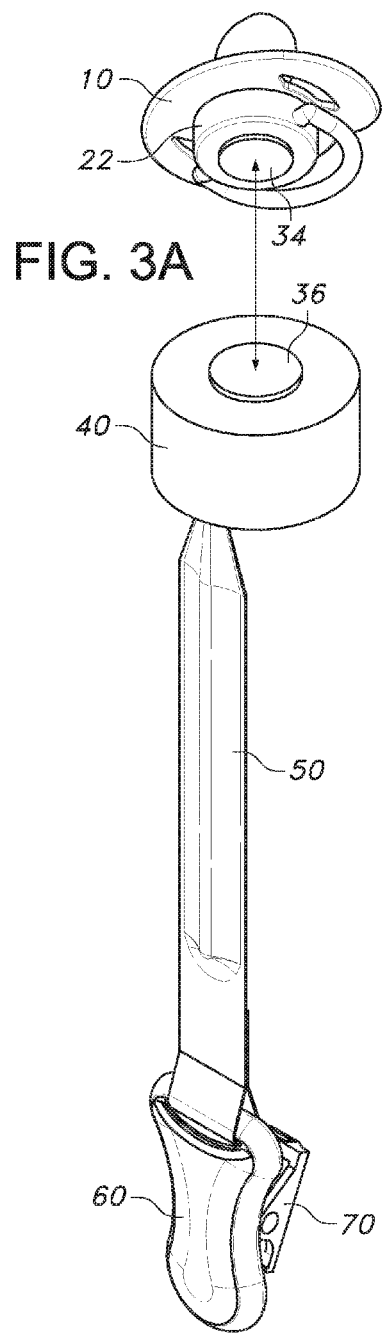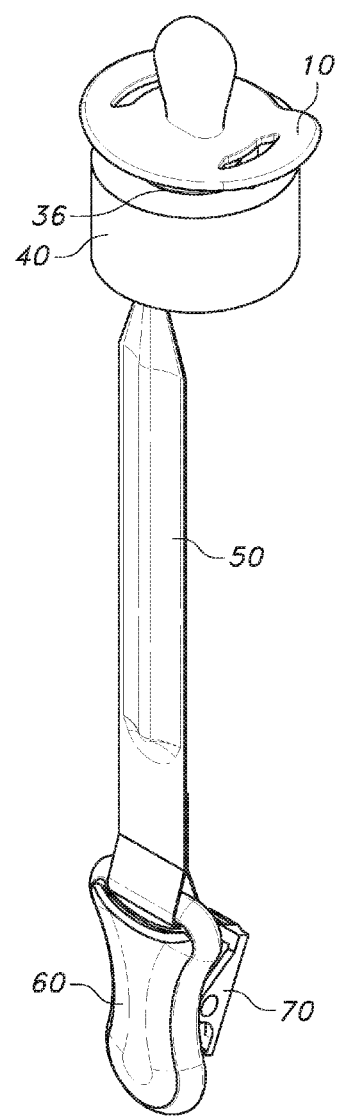
FIG. 3A
FIG. 3B
FIG. 3C

DIGITAL CAMERA MOUNTED ON A PACIFIER AND METHOD OF USE

CROSS-REFERENCE RELATED APPLICATIONS

This application is a non-provisional of U.S. Ser. No. 62/119,356, which as filed Feb. 23, 2015 under 35 U.S.C. § 119(e) and is incorporated herein by the reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable

BACKGROUND OF THE INVENTION

Field of the Invention

This disclosure relates to point-of-view (POINT OF VIEW CAMERA) cameras, in particular to an integrated hands-free, POINT OF VIEW CAMERA action camera attached to a pacifier that is configured for remote, image acquisition and viewing.

Description of Related Art Including Information Disclosed Under 37 CFR 1.97 and 1.98

Integrated hands-free, point of view action sports video cameras are known in the art. Concealed "nanny cameras" are available for surveillance of child care workers. A need exits in the industry to provide child care facilities or camps, the ability of providing pictures from the point of view of a child to relatives of the child.

BRIEF SUMMARY OF THE INVENTION

This invention relates to an apparatus with a pacifier attached to a digital camera. The digital camera is oriented to provide a point of view picture of the user of the pacifier. This invention, in another embodiment, relates to a digital camera that is attached to the pacifier by a ferrous material and magnet combination.

This invention, in another embodiment, relates to a perpendicular or linear mounting member having a plurality of snap-in-finger projections, each of the plurality of snap-in-finger projections having a detent notch configured to retain the ring portion of a pacifier and a digital WI-FI capable camera attached to the perpendicular mounting member.

This invention, in another embodiment, relates to a method to obtain an image seen by a pacifier user. The steps of this method include: providing a digital camera mounted on pacifier apparatus, capturing, storing the image and proving the image to an interested party.

BRIEF DESCRIPTION OF SEVERAL VIEWS OF THE DRAWING(S)

The invention can be best understood by those having ordinary skill in the art by reference to the following detailed description when considered in conjunction with the accompanying drawings in which:

FIGS. 3A-3C illustrate perspective views of an embodiment of a pacifier with a point of view camera mounted on a tether.

DETAILED DESCRIPTION OF THE INVENTION

Figures 1A, 1B:
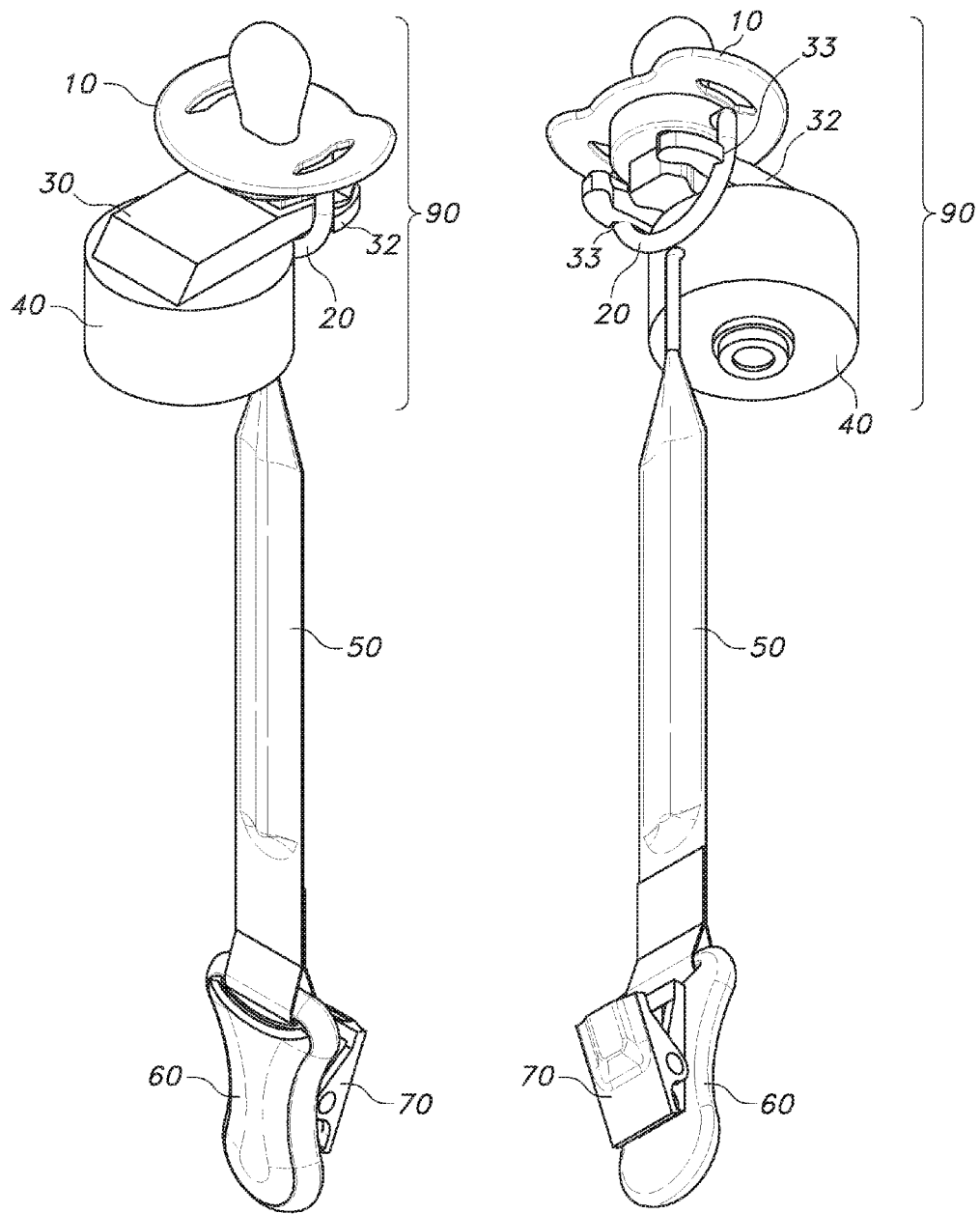
FIGS. 1A and 1B illustrate front and back perspective views of an embodiment of a pacifier with a point of view camera mounted.

The present invention may be understood more readily by reference to the following detailed description of the invention. It is to be understood that this invention is not limited to the specific devices, methods, conditions or parameters described herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. These and other aspects, features and advantages of the invention will be understood with reference to the detailed description herein, and will be realized by means of the various elements and combinations particularly pointed out in the appended claims. It is to be understood that both the foregoing general description and the following detailed description of the invention are exemplary and explanatory of preferred embodiments of the inventions, and are not restrictive of the invention as claimed. Unless defined otherwise, all technical and scientific terms used herein have the same meaning as commonly understood by one of ordinary skill in the art to which this invention belongs. Reference will now be made in detail to the presently preferred embodiments of the invention, examples of which are illustrated in the accompanying drawings. Throughout the following detailed description, the same reference numerals refer to the same elements in all figures.

Referring to FIGS. 1A and 1B, an illustrative embodiment is provided showing two views of a pacifier 10 connected to a perpendicular mounting member 30. The perpendicular mounting member 30, in this illustrative embodiment has a plurality of snap-in-finger projections 32. Each of the plurality of snap-in-finger projections 32 has a detent notch 33 configured to retain pacifier ring 20 of the pacifier 10.

A digital camera 40, preferably WI-FI capable, is attached to or integral with the perpendicular mounting member 30. A tether 50 is attached to the digital WI-FI capable camera 40 or alternatively to the perpendicular mounting member 30. The tether 50 has a mounting clip 60. The mounting clip 60 has a USB 70 attached. A cable (not shown in this figure) connects the digital WI-FI capable camera 40 to the USB 70. The cable (not shown in this figure) runs through the tether 50.

Figure 2A:
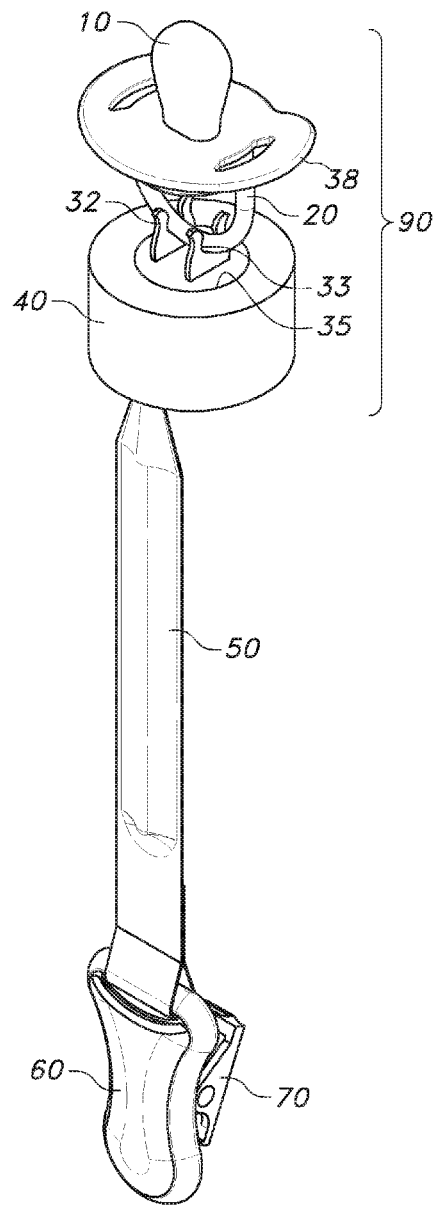
FIGS. 2A and 2B illustrate front and back perspective views an embodiment of a pacifier with a point of view camera mounted.
Figure 2B:
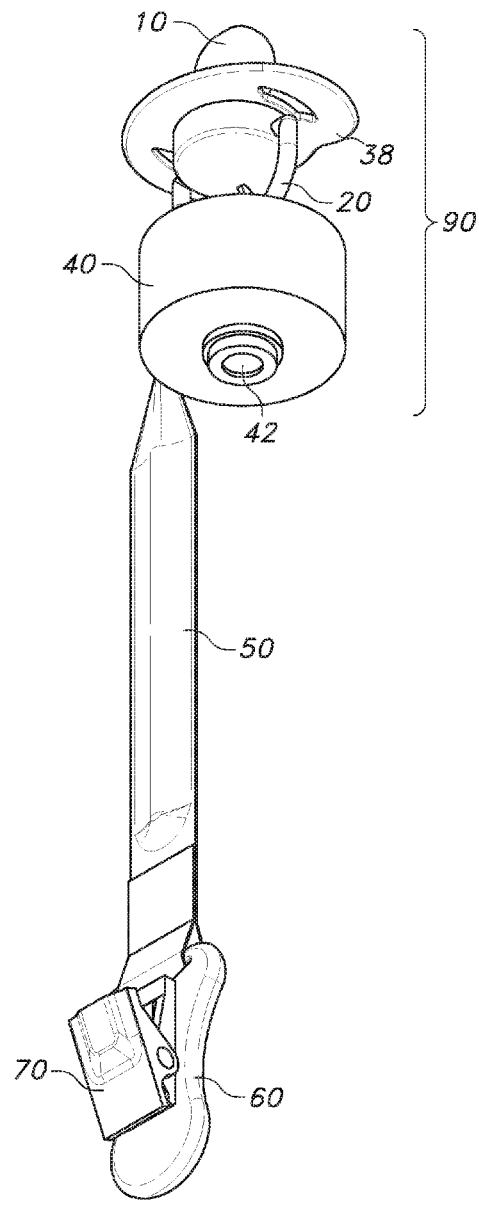

Referring to FIGS. 2A and 2B, an illustrative embodiment is provided showing two views of a pacifier 10 connected to a linear mounting member 35. The linear mounting member 35, in one illustrative embodiment, has a plurality of snap-in-finger projections 32. Each of the plurality of snap-in-finger projections 32 has a detent notch 33 configured to retain pacifier ring 20 of the pacifier 10.

Figure 7:
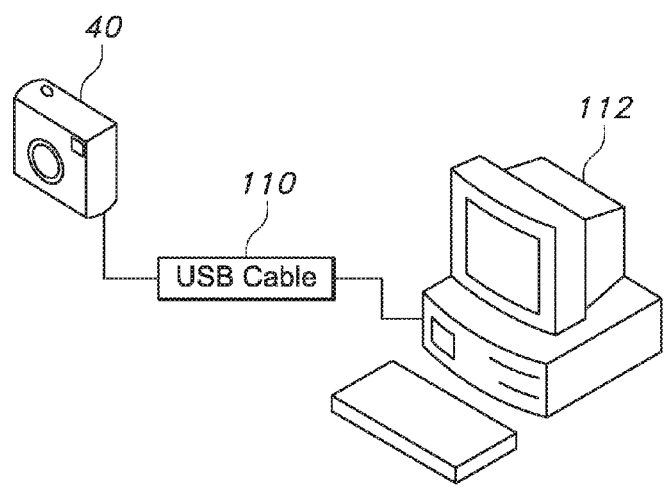
FIG. 7 illustrates the delivery of au image, obtained from a pacifier with a point of view camera, to various data storage devices.

In an alternative embodiment, the plurality of snap-in-finger projections 32 snaps into shield portion 38 of the pacifier 10. A digital WI-FI capable camera 40 is attached to or integral with the linear mounting member 35. A tether 50 is attached to the digital WI-FI capable camera 40 or alternatively to the perpendicular mounting member 30. The tether 50 has a mounting clip 60 to attach a USB 70. A cable (not shown in this figure) connects the digital WI-FI capable camera 40 to the USB 70. The cable (not shown in this figure) runs through the tether 50. A pacifier assembly 90 is made of a mounting member configured to connect to a pacifier and a digital WI-FI capable camera 40 positioned to obtain a point-of-view image from the perspective of a pacifier user. A pacifier user 100 (FIG. 7) is, for example, a baby or toddler.

Now referring to FIGS. 3A-3C, an embodiment of a pacifier 10 is illustrated with a digital WI-FI capable camera 40 mounted on a tether 50, wherein the pacifier 10 and the digital WI-FI capable camera 40 are directly connected. In this embodiment, a first magnetic element 34 is integral (attached or integrated) with the pacifier body 22 and a second magnetic element 36 is attached or integrated in to digital WI-FI capable camera 40. It is understood that the term magnetic element means one of either the magnet or the ferrous material to form a combination that attaches the pacifier 10 to digital WI-FI capable camera 49, such that the digital WI-FI capable camera 40 provides an image from the point of view of the user of the pacifier 10. In one embodiment, the first magnetic element 34 is a magnet and it connects to second magnetic element 36, such as a ferrous plate attached to the digital WI-FI capable camera 40. In another exemplary embodiment, the first magnetic element 34 of the pacifier 10 is a ferrous plate and it connects to second magnetic element 36, such as a magnet attached to the camera 40.

Figure 4A:
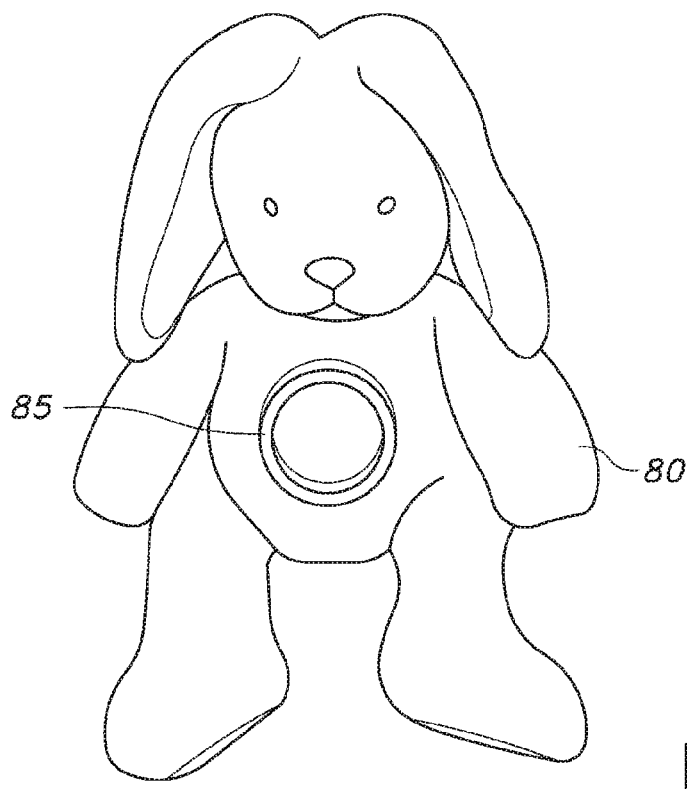
FIGS. 4A and 4B illustrate an embodiment of a pacifier with a point of view camera mounted on a tether with a decorative cover.
Figure 4B:
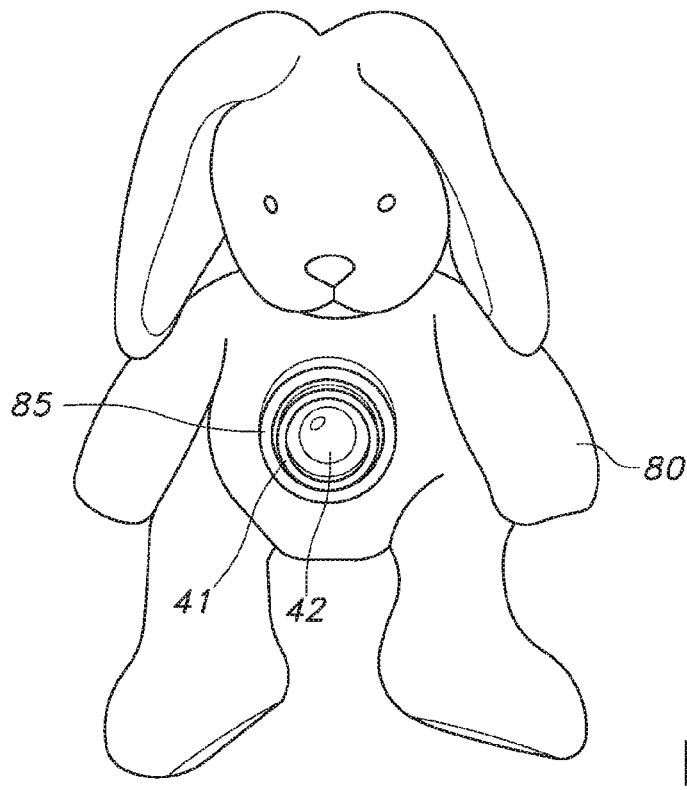

Now referring to FIGS. 4A and 4B, a decorative cover 80, such as a bear or monkey, is configured to cover the housing 41 of the, digital WI-FI capable camera 40, but the decorative cover 80 is configured to leave the lens 42 of digital camera 40 exposed. In one embodiment, this can be accomplished by providing a decorative cover 80 including a mount 85. The mount 85 is sized to accommodate the housing 41 and to position the decorative cover 80 around the housing 41 of the digital camera 40, but to leave the lens 42 exposed to take pictures or videos from the point of view of a user.

Figure 5:
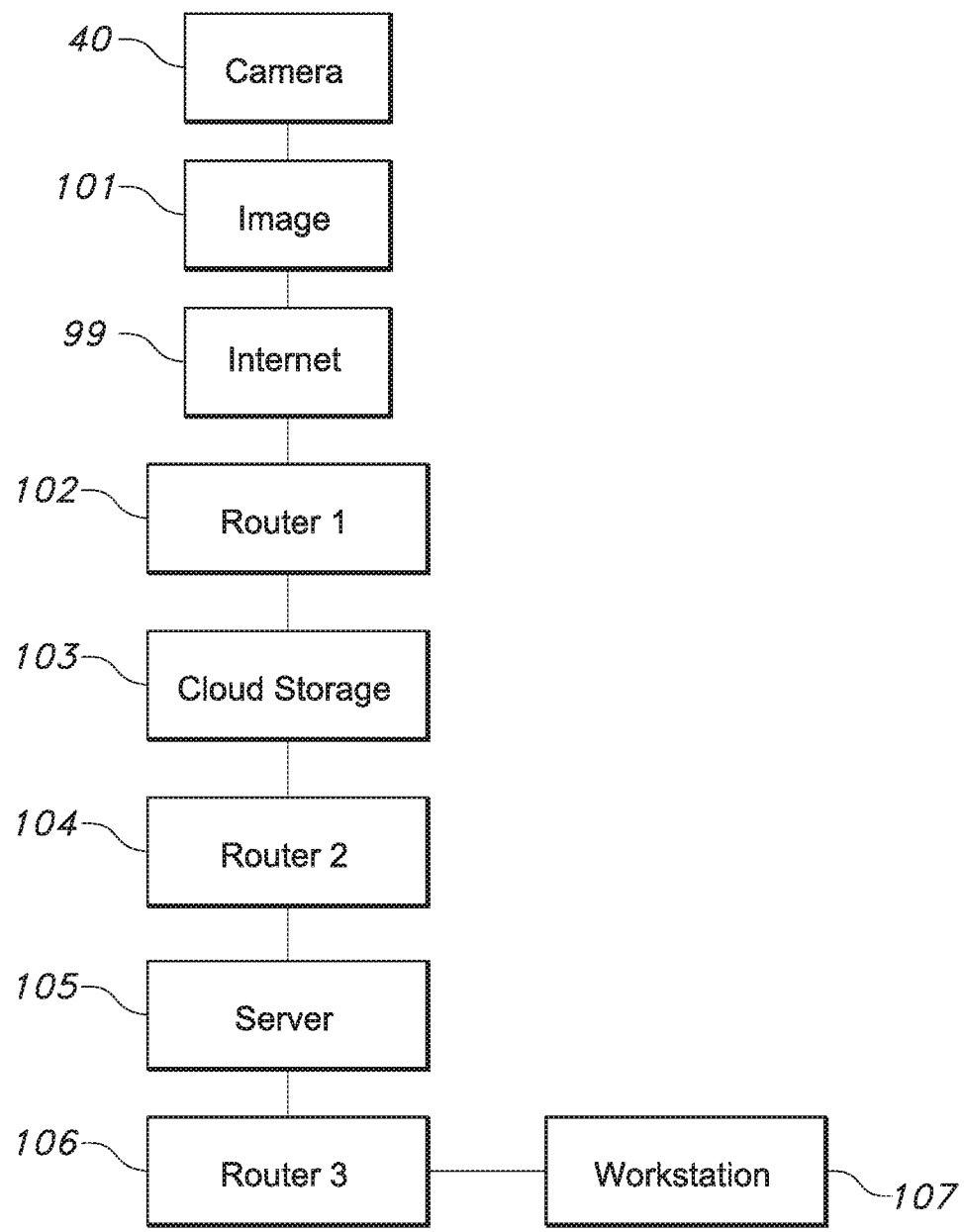
FIG. 5 is a block diagram showing the flow of data from the camera to a work-station.
Figure 6:
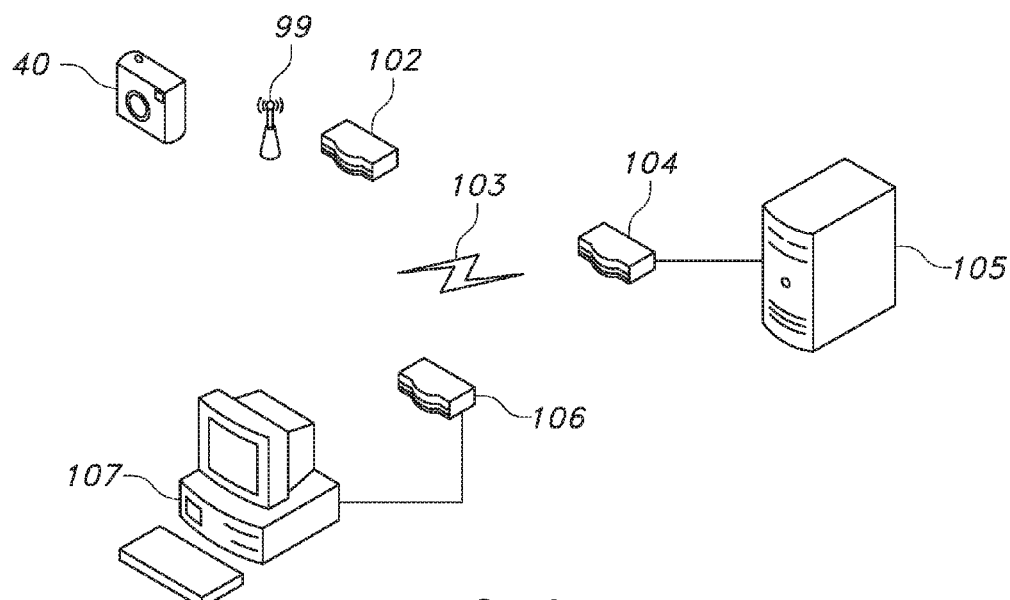
FIG. 6 illustrates the delivery of an image, obtained from a pacifier with a point of view camera, to various data storage devices.

Now referring to FIGS. 5 and 6, this illustrative embodiment represents how the camera image 101 transfers takes place in a typical environment that connects to a public Internet 99 and transfer to and from a Cloud Storage server 105. In such an environment, every location must have a router (102, 104, 106) for the three routers at the three different locations: the camera 40 location, the Cloud Storage server 105 location and the Data Retrieval workstation's location 107 (a PC or phone or tablet). Each router has two IP addresses—an internal one of the form 192.168.x.y that is seen by all of the devices at that location, and an external one of the form nnn.mmm.xxx.yyy that is assigned by the internet provider, such as Comcast or AT&T.

The internal IP addresses are referred to as R1.1, R2.1 and R3.1 and the external IP addresses are referred to as E1.1, E2.1, E3.1. Each device has an IP address and that is assigned to it by its local router. These are referred to here as C.1 for the camera 40, S1.1 for the Cloud Storage server 105 and W1.1 for the retrieval workstations 107, and each has a port number on its router (CP, SP and WP) that is part of the source information, so packets coming back to a router can know what device on the router receives that packet. All of the communication is done in what the internet calls "digital packets"—each consisting of a header and a body. The header holds a source IP address and a destination IP address and PORT and the body holds the digital information that in this case is the digitize photo to create a digital photograph or video. The camera 40 takes the picture or video and digitizes it into a form readable by computers, i.e. "digital data." It places this into a packet with C1.1 as the source IP address and E2.1 as the destination IP address (the storage system's router's external IP) and a port number that R2 knows represents a specific server (SP). It transmits this through its wireless transmitter (WIFI) to the receiver of the wireless router (R1). This router (R1) will take the packet, save the C1.1 source IP into an internal table and then over-write it with E1.1 as the new source packet and the CP port number and send it out over the internet. Through the internet cloud 103, this is routed to the Cloud Storage's router 104 (R2) which saves the E1.1 source IP and CP port into a table and over-writes the destination IP with S1.1 and then sends the packet onto the Cloud Storage server 105 (S1) where it is placed into a storage device with electronic tiles and folders. This Cloud Storage server 105 responds back to the camera 40 with a short acknowledgement packet whose source IP is S1.1 and destination IP is E1.1 and the port CP. This arrives back at router 102 R1 that replaces the destination address with the camera's C1.1 IP then sends it on to the camera 40 (C1). The camera 40 now knows the transmission was successful and ends its transmission program.

Now referring to FIG. 6, when someone wishes to retrieve one of the pictures or videos from the Cloud Storage server 105 (S1) they must use a workstation 107 (W1) such as a PC or phone or tablet. This workstation 107 device communicates with the internet through its own local router 106 (R3). W1 sends a request packet with its IP as the source IP and the Cloud Storage servers 105 S1.1 IP as the destination along with the SP port number. Router 106 R3 receives this and replaces the source IP with R3.1 and a port number WP.

This is sent into the cloud and received by router 104 R2 which uses the SP port number to know how to route this to the storage server's S1.1 IP address now with R2.1 as the source IP but WP is still the source port. The Cloud Storage server 105 (S1) processes the request, retrieves the desired image, and places it into a packet with S1.1 as the source IP and E3.1 as the destination packet and WP as the destination port. The R2 router 104 receives this and routes it onto the workstation's R3 router 106 through the cloud after replacing the source IP with R3.1 and the SP port. The R3 router 106 receives this packet and using the WP source port ID, routes this onto the workstation after over-writing the destination IP with W1.1.

In an alternative embodiment, the digital camera 40 connects directly to a PC, phone or tablet 112 via a USB cable 110. In this embodiment, the digital camera 40 functions as an external storage device, such as a thumb drive that can provide data, i.e. the image 101 to a PC, phone or tablet 112.

Figure 8:
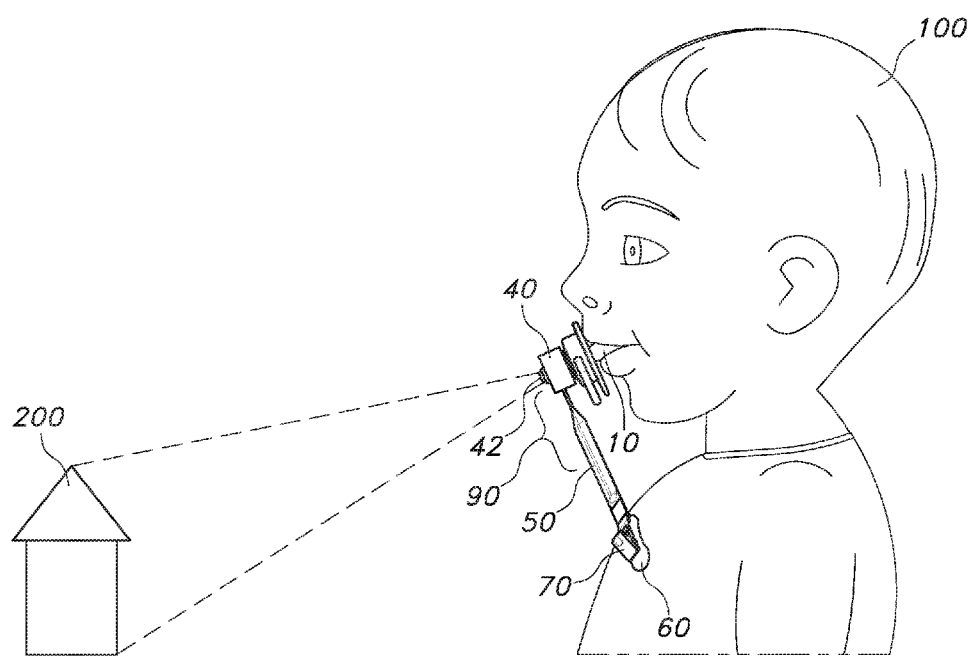
FIG. 8 illustrates an embodiment of a pacifier with a point of view camera mounted on a tether.

Now referring to FIG. 8, a pacifier user 100 employs the pacifier assembly 90 to obtain an image of scene 200 from the point of view of the user 100, that can be distributed by wireless transmission to a relative or interested person of the user 100.

Equivalent elements can be substituted for the ones set forth above such that they perform in substantially the same manner in substantially the same way for achieving substantially the same result. It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof it is the intention of the following claims to encompass and include such changes.

The invention claimed is:

1. An apparatus comprising:
   a pacifier configured to position a digital camera to take a point-of-view picture from the perspective of a pacifier user and
   a first magnetic element integral with a body of the pacifier positioned to connect with the digital camera.

2. An assembly comprising:
   a mounting member configured to connect to a pacifier; and
   a digital camera, wherein said mounting member is configured to position the digital camera, to obtain a point-of-view image from the perspective of a pacifier user and a perpendicular mounting member having a plurality of snap-in-finger projections, each of the plurality of snap-in-finger projections having a detent notch configured to retain a pacifier ring of the pacifier.

3. The assembly of claim 2 further comprising: a tether attached to said perpendicular mounting member.

4. The assembly of claim 2 wherein said tether has a mounting clip, and said mounting clip has a USB attached thereto.

5. The assembly of claim 3 wherein said tether has a mounting clip, and said mounting clip has a USB attached thereto.

6. The assembly of claim 2 further comprising: a linear mounting member having a plurality of snap-in-finger projections, each of the plurality of snap-in-finger projections having a detent notch configured to retain a ring of the pacifier.

7. The assembly of claim 6 further comprising: a tether attached to the digital camera.

8. The assembly of claim 6 further comprising: a tether attached to said perpendicular mounting member.

9. The assembly of claim 7 wherein said tether has a mounting clip, and said mounting clip has a USB attached thereto.

10. The assembly of claim 8 wherein said tether has a mounting clip, and said mounting clip has a USB attached thereto.

11. A method to obtain an image from the perspective of a pacifier user comprising the steps of:
    providing a digital camera attached to a pacifier, wherein said digital camera is positioned to obtain an image from the perspective of the pacifier user, and capturing said image with said digital camera;
    converting the image into a digital data;
    transmitting said digital data to a cloud storage server; and
    transmitting said digital data to a workstation, further comprising the steps of:
    transferring the digital data to a device via a USB cable, wherein said device is selected from the group consisting of: PC, phone and tablet and wherein said USB cable is connected to a USB on a tether connected to said digital camera.

* * * * *